United States Patent
Bergmans et al.

(10) Patent No.: US 9,655,210 B2
(45) Date of Patent: May 16, 2017

(54) LIGHTING SYSTEM AND METHOD OF CONTROLLING THE LIGHTING SYSTEM

(71) Applicant: Nederlandse Organisatie voor toegepast-natuurwetenschappelijk onderzoek TNO, The Hague (NL)

(72) Inventors: Jeroen Bergmans, The Hague (NL); Armin van der Togt, The Hague (NL); Per Majlor Ambrosiussen, The Hague (NL)

(73) Assignee: NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 14/655,188

(22) PCT Filed: Dec. 23, 2013

(86) PCT No.: PCT/NL2013/050946
§ 371 (c)(1),
(2) Date: Jun. 24, 2015

(87) PCT Pub. No.: WO2014/104881
PCT Pub. Date: Jul. 3, 2014

(65) Prior Publication Data
US 2015/0342008 A1   Nov. 26, 2015

(30) Foreign Application Priority Data
Dec. 24, 2012   (EP) .................................... 12199349

(51) Int. Cl.
*H05B 37/02*   (2006.01)

(52) U.S. Cl.
CPC ........ *H05B 37/0245* (2013.01); *Y02B 20/445* (2013.01)

(58) Field of Classification Search
CPC .................................................. H05B 37/0245
See application file for complete search history.

(56) References Cited

U.S. PATENT DOCUMENTS

| | | |
|---|---|---|
| 2008/0218087 A1 | 9/2008 | Crouse et al. |
| 2009/0014625 A1 | 1/2009 | Bartol et al. |

(Continued)

FOREIGN PATENT DOCUMENTS

| | | |
|---|---|---|
| WO | WO2012131631 A1 | 10/2012 |

OTHER PUBLICATIONS

Office Action issued in European Patent Application No. EP 13 818 517.8 on Mar. 16, 2017.

*Primary Examiner* — Douglas W Owens
*Assistant Examiner* — Pedro C Fernandez
(74) *Attorney, Agent, or Firm* — Hoffmann & Baron, LLP

(57) ABSTRACT

A lighting system is provided that has lighting units and sensor units. One of the sensor units is first sensor unit that comprises a user control device for receiving user commands when a user enters the commands at the user control device. The lighting units are controlled according to a lighting plan that defines a group of the lighting units that is to be switched on in response to detection of a user command at the user control device, based on light transfer coefficients relating light intensities at the sensor units to light output from the lighting units. The transfer coefficients from the lighting units to each sensor unit are determined. The lighting plan is determined from the transfer coefficients by selecting the group of lighting units based on the transfer coefficients from the lighting units to the first sensor unit. The transfer coefficients from the lighting units to a sub-set (Continued)

of the sensor units may be used, the sub-set being selected for the first sensor unit, based on the transfer coefficients for the sensor units from an initial group of one or more of the lighting units associated with the first sensor unit.

23 Claims, 5 Drawing Sheets

(56) References Cited

U.S. PATENT DOCUMENTS

| | | | |
|---|---|---|---|
| 2009/0045971 A1* | 2/2009 | Simons | H05B 37/0272 340/9.16 |
| 2011/0026434 A1 | 2/2011 | Van Der Stok et al. | |
| 2011/0031897 A1 | 2/2011 | Henig et al. | |
| 2011/0057581 A1 | 3/2011 | Ashar et al. | |
| 2011/0302282 A1* | 12/2011 | Dadlani Mahtani | H05B 37/029 709/221 |
| 2011/0310621 A1* | 12/2011 | Van Der Stok | H05B 37/0272 362/311.12 |
| 2012/0068608 A1 | 3/2012 | Covaro et al. | |
| 2014/0300276 A1* | 10/2014 | Wang | H04L 12/2807 315/151 |

* cited by examiner

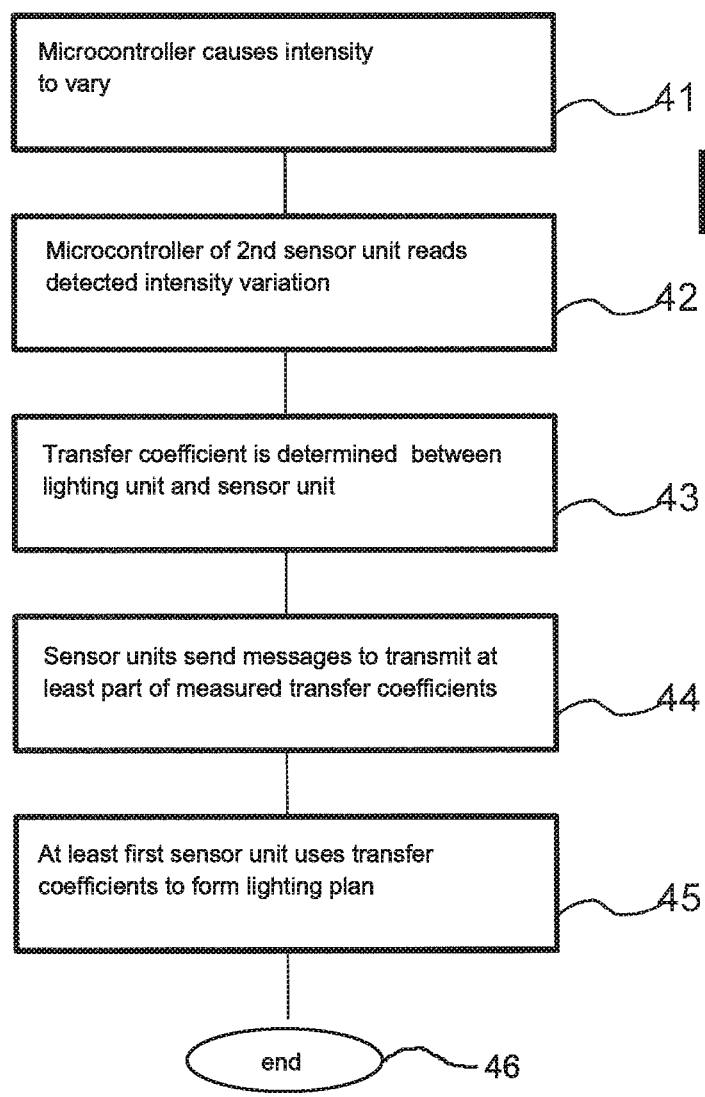

LIGHTING SYSTEM AND METHOD OF CONTROLLING THE LIGHTING SYSTEM

This application is the U.S. National Phase of, and Applicants claim priority from, International Patent Application Number PCT/NL2013/050946 filed Dec. 23, 2013, which claims priority from EP 12199349.7 24 filed Dec. 24, 2012, each of which is incorporated herein by reference.

FIELD OF THE INVENTION

The invention relates to a lighting system and to a method of controlling the lighting system.

BACKGROUND

It is known to control light sources by means of sensors and control devices like switches that communicate with each other and the light sources via a communication network. The sensors can be used in feedback loops, to measure whether a received light intensity differs from a target value and send adjustment messages to the light sources to change emitted light intensity according to the difference. Switches coupled to the communication network can be used to receive user commands to control the light intensity and transmit messages to the sensors to establish the target values.

The installation of this type of lighting system involves implicit or explicit formulation of a lighting plan that defines the light sources that should be switched on and off in response to different control devices. Furthermore, when feedback is used, the lighting plan needs to define the sensors for which target values are changed in response to a control device and the light sources that should be controlled in a feedback loop based on these target values. Such lighting plan implicitly reflects spatial relations between light sources, control devices and optionally sensors. Usually a control device in one room will only be used to control light sources in that room, or only light sources close to the control device within that room.

Determining such an implicit or explicit lighting plan can be a complex task, which involves setting network addresses in the light sources, sensors and switches so that sensors and switches will send messages to selected light sources and sensors. Solutions have been proposed to simplify this task, for example by automated address setting when a user pushes dedicated buttons on a lamp and a control switch to indicate that the switch should control the lamp. But in a system with many lamps this still involves considerable human effort.

WO 012131631 describes an autocommissioning of a lighting system wherein configuration parameters such as addresses related to the location of the lighting sources are set automatically. Each light source detects and identifies its closest neighbor using light intensity measurements. Next the light sources one after the other set the configuration parameters relating to the location of their closest neighbors. When the light sources are arranged in a grid, their location in the grid is thus automatically determined. The resulting configuration parameters can be used to produce location dependent commands.

SUMMARY

Among others, it is an object to provide for a method of automated installation of a lighting system that requires less human configuration effort A method according to claim 1 is provided. Herein light sensor units are used to collect information that can be used in the definition of a lighting plan. At least one of the sensor units comprises a user control device such as a manually operable switch or current control device, for receiving user commands when a user enters the commands at the control device. Alternatively, the sensor may be coupled to the user control device for this purpose. In addition the sensor units may be used for their conventional role in feedback loops.

Light transfer coefficients are used that relate light intensities at the sensor units to light output from the lighting units. If has been found that such transfer coefficients provide sufficient implicit information about the relative spatial locations of sensor units and lighting units to define a lighting plan that explicitly or implicitly defines a group of the lighting units that is to be switched on in response to detection of entry of a user command at the user control device.

In a simple embodiment a transfer coefficient from a lighting unit to a sensor unit is a number that represents a size of the change of measured light intensity at the sensor unit, measured when the lighting unit is switched from one state to another. The transfer coefficients are used as implicit indications of effective distances between sensor units and lighting units. As used herein, a lighting unit can be a light source like a lamp or a device that controllably passes incoming light, like a controllable sunshade. At the same time the lighting unit may also comprise a sensor to sense light from other lighting units, making the lighting unit a sensor unit as well. The light intensity used to determine the transfer coefficients may be an overall light intensity, or an intensity wherein contributions with different wavelengths are weighed differently. In an embodiment the lighting units may switch states one by one and each lighting unit may transmit one or more messages over a communication network, signaling these state changes and the identity (e.g. the network address) of the lighting unit. Alternatively another unit could transmit the messages, the lighting units responding to the messages by effecting the state changes. The sensor units may receive the messages and determine the transfer coefficients from the measured size of the change of light intensity at substantially the time of reception of each message. However, it should be realized that switching a lighting unit from one state to another and detecting the size of the substantially simultaneous change of measured light intensity is but one of many possibilities to determine the transfer coefficients.

In a further embodiment, the transfer coefficients may be normalized coefficients, that is, a ratio of the size of the change of measured light intensity and the nominal change of light intensity emitted by the lighting unit. The latter may be different for different types of lamp for example. In another embodiment, the transfer coefficients may be quantized values, equal to one or zero for example dependent on whether the size of the change of measured light intensity is above or below a threshold for example. In other embodiments transfer coefficients that may have values in a quasi continuous range may be used, the range containing more than two values, e.g. at least 256 values.

Determination of the lighting plan comprises the determination of a group of lighting units that is to be associated with the control device of one of the sensor units (the requirement that one of the sensor units has a control device should not be construed to exclude that other sensor units also have a control device and may be associated with other groups). The association means that the lighting units will be switched on in response to detection of a user command at the control device, or that these lighting units will be caused to emit increased light intensity in response to that detection. Other commands could be used to switch lighting units in the group off, or cause the lighting units in the group to emit decreased light intensity. Yet other commands may be provided to adjust the color content of emitted light of lighting units in the group.

The group of lighting units is determined based on the transfer coefficients from the lighting units to the first sensor unit. In an embodiment only lighting units for which these transfer coefficients exceed a predetermined threshold value may be selected in the group, indicating that these are the closest lighting units. This provides for a simple way of determining the group. In an embodiment, the size of the group may be user selectable. The first sensor unit may have a user input device, for receiving a user command to increase or decrease the size of the group. In response, the predetermined threshold value may be lowered or raised, and the group may be determined based on the changed value. But this provides only for a limited possibility to adjust the size of the group, in terms of the number of lighting units in the group and the spatial range covered by those lighting units and it may be affected by obstacles that block light.

In another embodiment, the group of lighting units is selected in steps, starting from an initial group of one or more closest lighting units to the first sensor unit, as indicated by the transfer coefficients. The initial group of one or more lighting units is used to select a subset of sensor units in the neighborhood of the lighting units in the initial group, as indicated by the transfer coefficients. Then lighting units in the neighborhood of sensor units in the subset are selected into the group that will be controlled by the control device of the first sensor unit.

In an embodiment, this group selection may be performed in a configuration unit that may be the first sensor unit, any other one of the sensor units, any one of the lighting unit or a central unit. To do so, the sensor units may transmit messages over communication network to the configuration unit, signaling the transfer coefficients. The configuration unit may use these transfer coefficients and/or transfer coefficients that have been determined by the configuration unit itself to determine the initial group, the subset and the group of lighting units that will be controlled by the control device of the first sensor unit. When the configuration unit is not the first sensor unit, the configuration unit may then send one or more messages indicating the selected group to the first sensor unit.

In an embodiment the initial group may consist of lighting units for which the transfer coefficients to the first sensor unit is above or equal to a threshold value. As used herein threshold values in general may be predetermined fixed values, or threshold values derived on the basis of the transfer coefficients. Thus for example a threshold value may be selected equal to an Nth ranking transfer coefficient value in a series of transfer coefficients that are ordered according to size. In this case when N=1, the initial group consist of the lighting unit for which the transfer coefficient to the first sensor unit is highest.

In an embodiment the subset of sensor units may be selected by selectively including sensor units to which the transfer coefficients from any one of the lighting units in the initial group is above a threshold value.

In an embodiment the group of lighting units is selected by selectively including lighting units for which the transfer coefficients to any one of the sensor units in the sub-set is above a threshold value. Alternatively, the group of lighting units may be selected by first setting target values for sensing results of the sensor units in the sub-set. In this embodiment use can be made of equations for those target values in terms of the transfer coefficients and combinations of settings of the lighting units. Thus for example, the equation for a sensing value S(i) of a sensor unit indexed by i may be $$S(i) = \text{Sum} R(i,j) * V(j)$$

wherein $R(i,j)$ is the transfer coefficient from a lighting unit indexed by j to the sensor unit i, $V(j)$ is a control value of the lighting unit j that is representative of its emitted intensity and the sum is taken over lighting units j. When the lighting unit j is an on/off device $V(j)$ may have zero or non-zero value for example, dependent on whether the lighting unit is off or on respectively. Thus the equations express sensing values as a function of a combination of control values for different lighting units. Inversely, a combination of settings may be determined as a solution of the equations, according to the equations, at least approximately results in the target values. Although in some embodiments such a solution may be determined by inversion, in other embodiments it may be determined by performing a search for a combination that results in a best approximation of the target value. In this case, additional constraints may be imposed on the solution, such as a requirement that no more than a predetermined number of lighting units should be "on" in the combination, and/or that only lighting units from a pre-selection of lighting units may be on in the combination. The lighting units that are on in the solution based on the target values form the group of lighting units for the first sensor units in this embodiment.

In an embodiment, the group of lighting units for an expanded area may be selected by means of iterations, wherein successive initial groups of lighting units are selected each from a preceding initial group of lighting units via a subset of sensor units that is determined from the preceding initial group using the transfer coefficients. The iterations may be performed for example until the group does not expand any more, in which case all lighting units in a room of a building may be in the group.

In an embodiment, the method comprises a step of adjusting a size of the group of lighting units in response to user input at the first sensor unit. Thus, the user may adjust a size of an area that will be lighted in response to switch on by means of the control device of the first sensor unit. The area may be increased or decreased in steps for example each time when the user pushes a corresponding button, or the area may be adjusted quasi continuously when the user adjusts a dial or a slider.

During size adjustment, the selection of lighting units in the group is adjusted based on the transfer coefficients. This may be realized for example by adjusting one or more thresholds used in the selection of the group in response to the user input. In an embodiment the size of the group may be increased in steps by selecting the group in more than one iteration.

When there is a plurality of sensor units with a control device that can act as first sensor units, each may have its own group of lighting units in the lighting plan. The groups for different first sensor units may overlap. If a lighting unit is in the groups of a plurality of first sensor units, it may be (kept) switched on if the first sensor units of any of the group switches it on.

In further embodiments, the lighting plan may also comprise selection of light intensity value for lighting units with controllable intensity and/or selection of target values for sensor units in feedback loops. In an embodiment, one plan with such a selection may be made based on sets of target values for a plurality of first sensor units that have received a user command to switch the light on, the lighting plan being made for using a target value for each sensor device that is the maximum for that sensor device in the sets of target values.

A lighting system is provided that performs the method. A configuration unit for use in such a lighting system is provided to select the group of lighting units and cause commands to be sent to the lighting units in the selected group in response to detection of a user command by the control device of the first sensor unit. The first sensor unit may be configured to act as configuration unit.

A computer program product, such as a computer readable medium like an optical or magnetic disk or a semiconductor memory, e.g. a non-volatile memory, is provided containing a program for making a computer perform the method.

BRIEF DESCRIPTION OF THE DRAWING

These and other objects and other advantageous aspects will become apparent from a description of exemplary embodiments, by reference to the following figures.

FIGS. 4,5 show parts of a flow-chart of a lighting control configuration process

DETAILED DESCRIPTION OF EXEMPLARY EMBODIMENTS

Figure 1A:
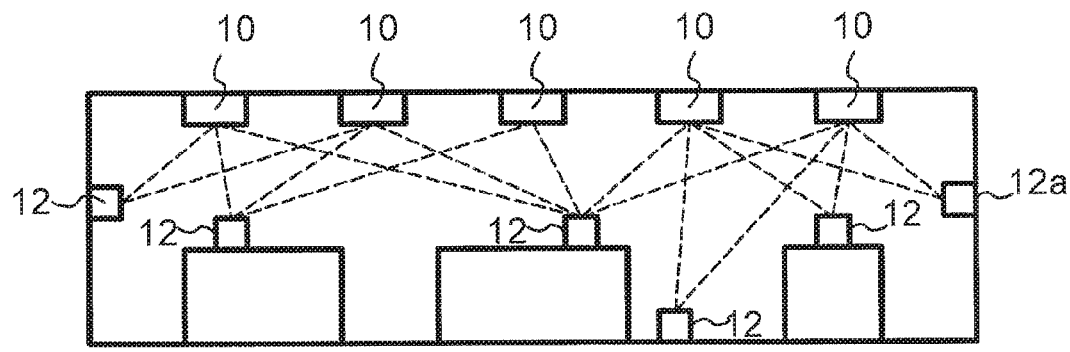
FIGS. 1a-c show examples of lighted spaces
Figure 1B:
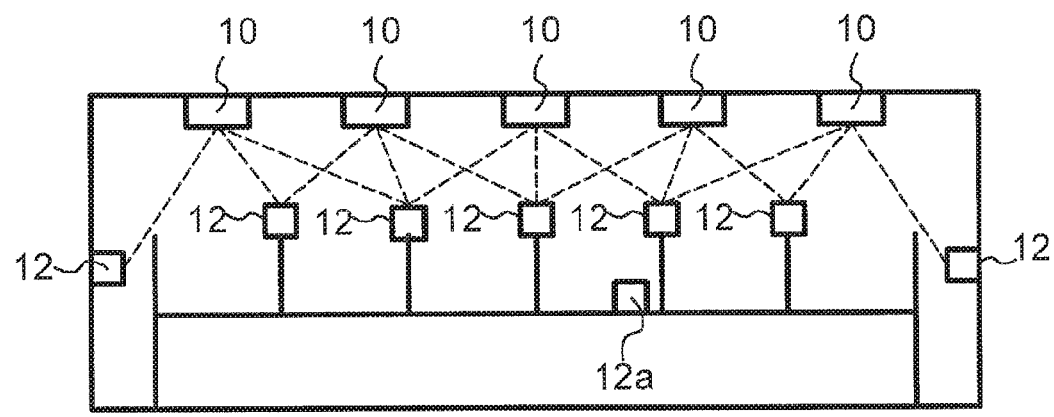
Figure 1C:
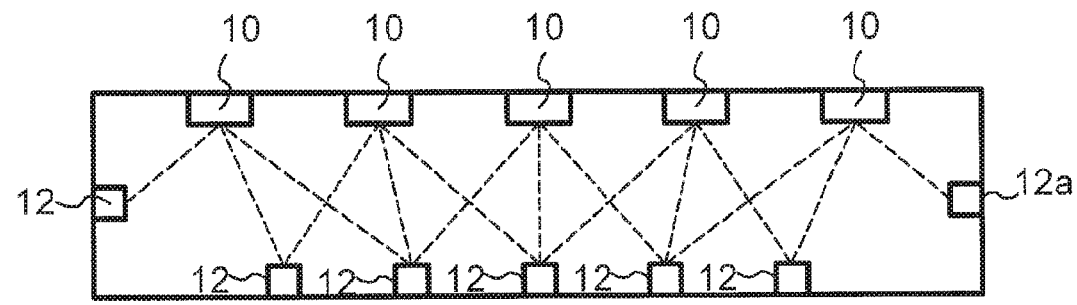
Figure 2:
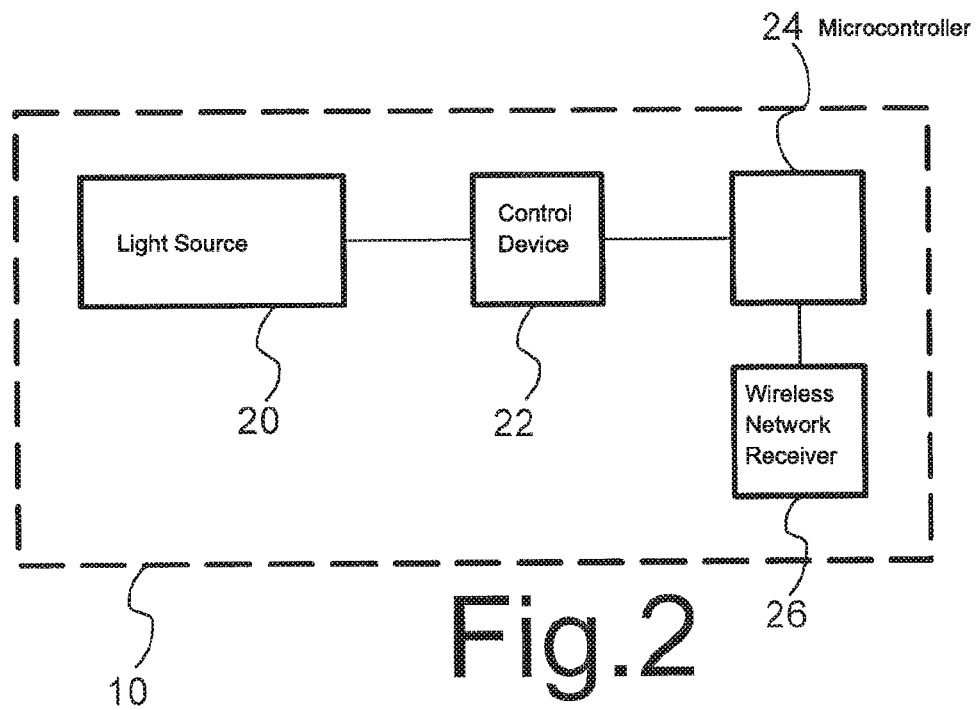
FIG. 2 shows a lighting unit.

FIG. 1a-c show examples of spaces with light source units 10 and sensor units 12. As can be seen, sensor units 12 are not part of light sources 10, but located at a distance from light sources 10, so that for each sensor unit 12 even light from the nearest light source travels through the space to the sensor unit 12 as shown by the dashed lines. FIG. 2 schematically shows an exemplary lighting unit 10. This lighting unit 10 contains a light source 20, such as a LED device, a fluorescent lamp, an incandescent or other lamp, a light source control device 22, such as a switch or current control device, a microcontroller 24 and a wireless network transceiver 26. Microcontroller 24 is coupled to light source control device 22 and wireless network transceiver 26. Light source control device 22 is coupled to light source 20. Light source control device 22 and light source 20 may be configured to operate using simple on/off control only, or using control to vary overall light intensity from light source 20, or under control to vary different intensities from light source 20 in a plurality of wavelength bands. It should be noted that other types of lighting unit may be used as well. For example, instead of light source 20 a controllable light shutter or damper may be used, such as a sunshade, or shutters and/or dampers in series with filters for respective wavelength bands.

Figure 3:
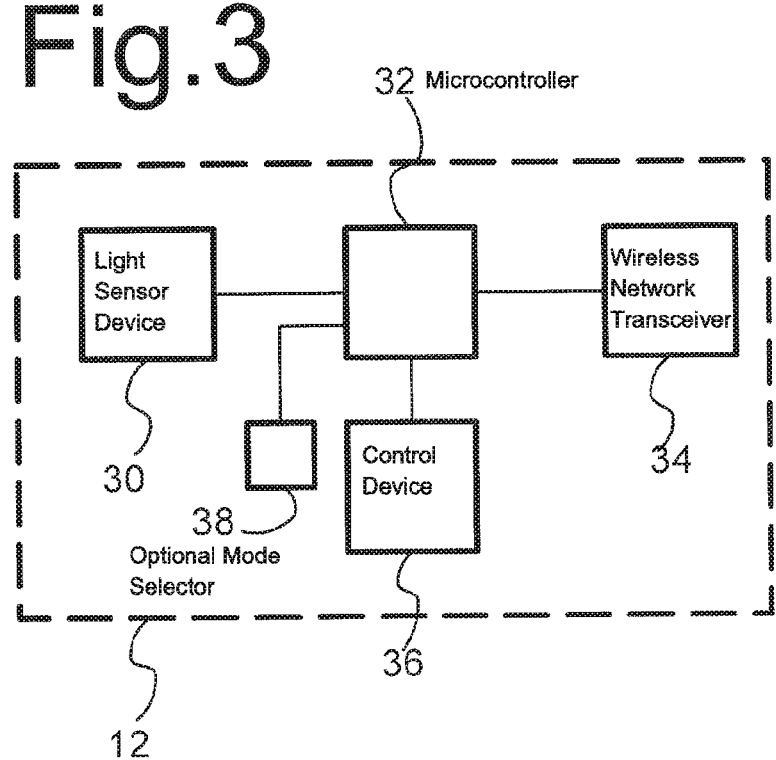
FIG. 3 shows a sensor unit.

FIG. 3 schematically shows an exemplary sensor unit 12. This sensor unit 12 contains a light sensor device 30, such as a sensor comprising a photo resistor or a photovoltaic cell, a microcontroller 32, a wireless network transceiver 34, an optional control device 36 such as a manually operable switch, a control slider or a control dial and an optional mode selector 38 such as a push button switch etc. Microcontroller 32 is coupled to light sensor device 30, wireless network transceiver 34, optional control device 36 and optional mode selector 38. Light sensor device 30 may have a single light intensity detector, or a plurality of detectors for intensity in respective wavelength bands. In an embodiment sensor unit 12 may be battery operated, and/or operated using energy harvested from incoming light. In an embodiment only part of the sensor units 12 contains a control device 36. In an embodiment only one of the sensor units 12 contains a control device 36. One or more of the lighting units 10 may include a sensor unit 12. But as shown in FIG. 1 at least part, or all, of sensor units 12 are not included in any light source 10, but located at a distance from the light sources 10.

Although lighting units 10 and sensor units 12 with wireless network transceivers 26, 34 are shown by way of example, it should be appreciated that alternatively part or all of lighting units 10 and sensor units 12 may have wired network transceivers 26, 34, such as transceivers that communicate via the electric mains connections. Lighting units 10 may communicate via the mains for example. Wireless communication may make use of ultrasonic signals, RF signals, infrared signals and/or modulation of visible light. In an embodiment the system may comprise one or more gateways to forward wireless messages from units with wireless transceivers to units with wired transceivers and vice versa, or between different types of wireless media.

The system need not contain a central unit, but in an embodiment a central unit with a central processor and its own network transceiver for communication with may be provided, with lighting units 10 and sensor units 12. In an embodiment one of the lighting units 10 or the sensor units may operate as a central unit.

The microcontrollers 24, 32 of the lighting units 10 and sensor units 12 are used to perform various types of processes, including a communication network configuration process, a lighting control configuration process and a lighting command process. Conventional processes may be used for the communication network organization process and the lighting command process.

The communication network organization process may comprise automatic selection of unique network addresses for the various lighting units 10 and sensor units 12. Methods for doing so are known per se. For example, microcontrollers 24, 32 may be configured to detect source addresses of messages transmitted by other units, select an address different from the detected source addresses and transmit a message containing the selected address as source address. The communication network organization process results in units with unique addresses, however without knowledge of the geographic locations of the units with those addresses.

Lighting Command Processes

Embodiments of lighting command processes will be described to illustrate various needs for information that depends on the identity of different lighting units 10 and sensor units 12.

A lighting command process comprises transmission of control messages to the units. As will be discussed in the context of the lighting control configuration process, the control messages may be used to implement user commands from the control device of a sensor unit 12 to control a plurality of lighting units, e.g. all lighting units 10 in a same room as the sensor unit 12 or a local group of lighting units in a user selectable neighborhood of the sensor unit. Message for feed forward control may be used, for example messages with simple on/off commands or, if the intensity from the lighting unit 10 is adjustable, messages with control values for setting the intensity. Instead of feed forward, feedback may be used when the intensity from the lighting unit is adjustable.

Methods of providing control messages doing so are known per se. For example, microcontroller 32 of a sensor unit 12 may be programmed to transmit control messages with network destination addresses in a predetermined set of one or more addresses of lighting units 10, in response to detection of a user command by control device 36. In the message a control value may be included. The microcontroller 24 of the lighting unit 10 may be configured to respond to reception of such commands to switch the light source on or off or, if the intensity of the light source is adjustable and the command contains a control value, to adjust its intensity according to the control value.

In an embodiment, lighting units 10 may be configured to respond to switch on commands from a plurality of selected sensor units 12. In this embodiment lighting units 10 may be configured to record for which of these selected sensor units 12 it has an extant switch on command, and to switch off only once it has no recorded extant switch on commands from any of these selected sensor units 12.

In a simple form of a feedback lighting command process, microcontroller 32 of a first sensor unit 12 may be programmed to compare sensed values of light intensity from light sensor device 30 with a target value to determine a control value for a lighting unit 10, to increase or decrease emitted light intensity according to whether the sensed values from light sensor device 30 are below or above the target value. In this embodiment microcontroller 32 may be programmed to transmit control messages with the control value and the network destination address of the adjustable lighting unit 10. The control value may be determined according to a simple proportional feedback scheme $$V=-c*(S(i)-T(i))$$

Herein V is the control value for the lighting unit, c is a coefficient, S(i) is a result of sensing at the sensor unit 12 (indexed by an index "i" to distinguish it from other sensor units 12 and T(i) it the target value. Instead of a proportional feedback scheme more complex schemed may be used, such as a proportional-integrating (PID) scheme.

In an embodiment, a sensor unit 12 may be configured to control a plurality of adjustable lighting units 10, using proportional or more complex feedback. For proportional feedback the control values may be $$V(j)=-c(j)*(S(i)-T(i))$$

Herein V(j) are control values for different lighting units 10 indexed by j and c(j) are coefficients for the different lighting units 10.

In another embodiment sensor units 12 may be configured to control a plurality of lighting units, using proportional or more complex feedback. For proportional feedback the control values may be $$V(j)=-c(j,i)*(S(i)-T(i))$$

Herein the c(j,i) are coefficients for different combinations of lighting units 10 j and sensor units i. In an embodiment c(j, i) may be unequal to zero only for one lighting unit 10.

As may be noted, such forms of control require information flow from one or more sensor unit 12 directly or indirectly to one or more lighting units 10 and a computation. The complete computation may be performed in one unit in the path of information flow, for example in a sensor unit 12, a central unit or a lighting unit 10, after receiving the required sensor data S(i) in messages from sensor units 12 if necessary and before transmitting messages with commands with control values and network destination addresses of the associated lighting units 10 if necessary. Alternatively, the computation may be distributed over different units along the path of information flow.

In an embodiment a selected unit (e.g. a sensor unit 12, a lighting unit 10 or a central unit) may be entrusted with the computation, i.e. as a network hub to which messages with sensor values for a control process should be sent and from which message with control values will be sent addressed to lighting units 10. The selected unit may be the sensor unit 12 wherein the control device 36 detected the user command for example. In an embodiment the selected unit may be configured to respond to detection of a user command by the control device 36 of a sensor unit 12 by sending command messages to sensor units 12 with destination addresses in a predetermined set to command these sensor units 12 to send messages containing sensing results from their light sensor device 30 to the selected unit for the purpose of feedback control.

In an embodiment, single light sensing and setting values may be used in the sensor units and the lighting units, but in another embodiment a plurality of light sensing and setting values for different wavelength bands may be used.

Lighting Control Configuration Processes

As will be apparent from the preceding, various lighting command processes require that lighting units 10, sensor units 12 and/or a central unit "know" network addresses of one or more selected lighting units 10 and/or one of more other sensor units 12 to which messages should be transmitted, or from which messages with commands should be received and the commands executed as part of feed forward or feed back control. The selection of these network addresses may depend on information about the relative spatial location of the units.

Furthermore, such lighting command processes may require that lighting units 10, sensor units 12 and/or a central unit "know" coefficients c(j, i) for one or more combinations of sensor units 12 and lighting units 10, optionally for different wavelength bands. The selection of these coefficients may also depend on information about the relative geographic location of a plurality of units as well as on their physical light emission and sensing properties.

The lighting control configuration process involves automatic programming of this type of knowledge. Alternatively, this type of knowledge could be entered into the system by a programmer. However, such manual programming is cumbersome and would require specialist knowledge.

Figure 4A:
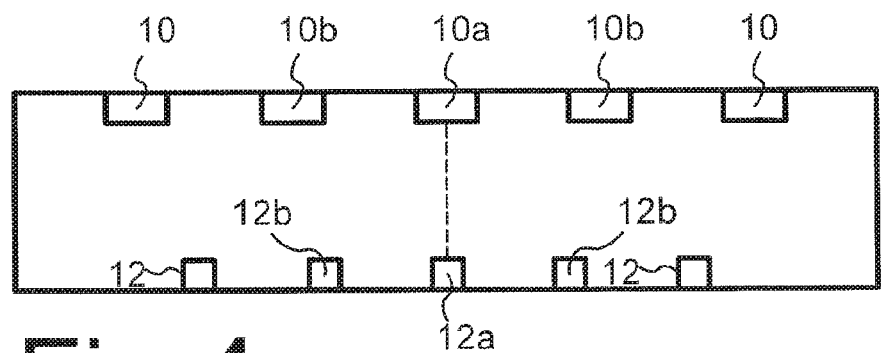
FIGS. 4a-c illustrate selection of a group of lighting units
Figure 4B:
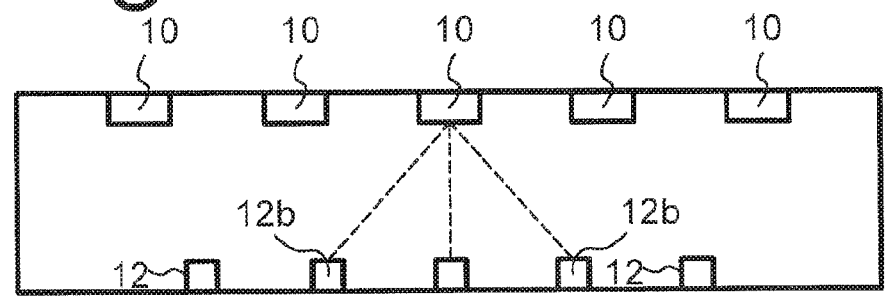
Figure 4C:
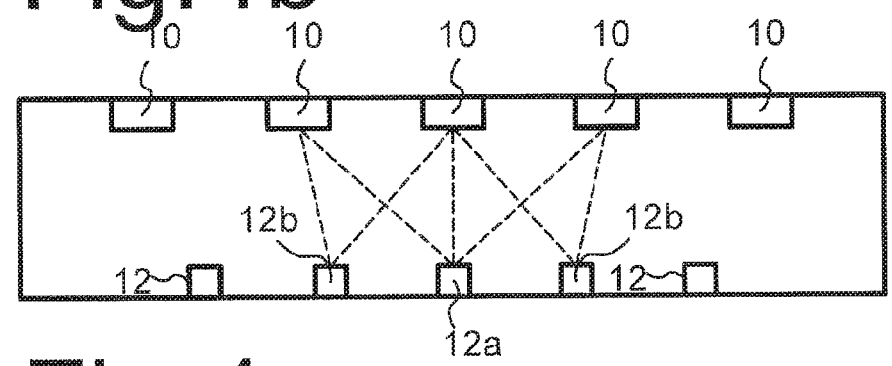
Figure 5:
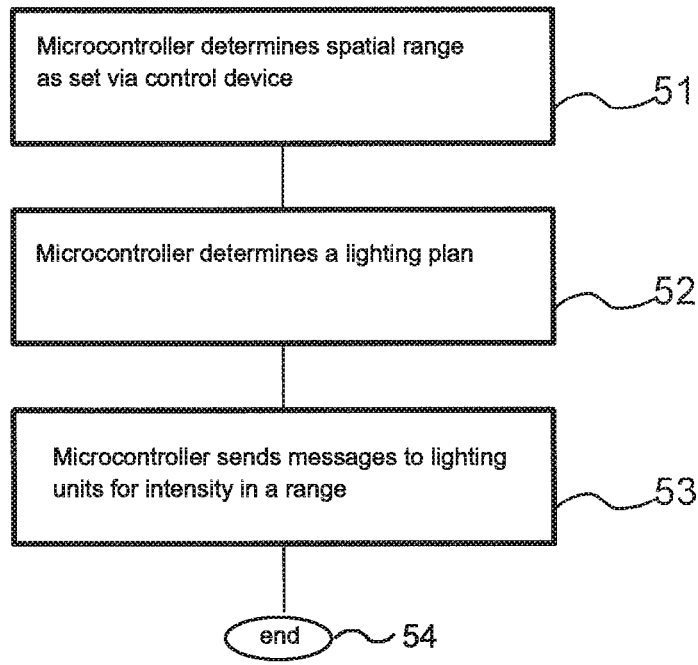

FIG. 4, 5 shows parts of a flow-chart of a lighting control configuration process. FIG. 4 shows a first part, wherein user independent parameters are determined. FIG. 5 shows a second part, wherein the user independent parameters are used to support user dependent adjustments of the lighting plan.

A first to third step 41, 42, 43 are used to determine transfer coefficients between lighting units 10 and sensor units 12. In first step 41 microcontroller 24 of a lighting unit 10 causes intensity of light provided by a lighting unit 10 to be varied. In second step 42 microcontroller 32 of a sensor unit 12 reads the detected intensity variation at the sensor unit 12. In third step 43 the transfer coefficient between the lighting unit 10 and the sensor unit 12 is determined. If a predetermined amplitude of emitted amplitude variation is used, microcontroller 32 of a sensor unit 12 may use the amplitude of the sensed light intensity variation at the sensor unit 12 as the transfer coefficient, optionally after correction for a known sensitivity of the sensor device 30 of the sensor unit 12. Alternatively, the transfer coefficients may correspond to thresholded values of the amplitude of the sensed light intensity variation.

When different lighting units 10 may use different amplitude of emitted variation, e.g. dependent on the type of lighting unit 10, the microcontroller 24 of a lighting unit 10 may be configured to cause an indication of the emitted amplitude to be transmitted, e.g. in the form of a lighting unit type indication. From this a normalized transfer coefficient may be determined by normalizing the detected amplitude of intensity variation according to the emitted indication of the amplitude.

Preferably, transfer coefficients are determined for every lighting unit-sensor unit (10, 12) pair, if only as a determination that the transfer coefficient is below a threshold. In a simple embodiment, this may be realized assigning an order to the network addresses of the lighting units 10, e.g. the order of ascending addresses, and varying the intensity of each lighting unit 10 successively in that order, e.g. by means of handover messages between successive lighting units 10. In this case, first and second step 41, 42 may be part of a loop, iterations of the loop being executed for successive lighting units 10, sensor units 12 executing second step 42 in parallel. In this case, third step 43 may be part of the loop, sensor units 12 determining the transfer coefficients for successive lighting units 10 successively in successive iterations.

However, other techniques may be used to distinguish different light sources. For example, different light sources 10 may select distinct temporal modulation patterns (e.g. periodic patterns that differ by use of different modulation frequencies and/or phases, or different modulation time sequences as in code division multiplexing), and provide light intensity variation according to its selected modulation pattern, the modulation patterns for different light source being provided simultaneously. In this case, sensor units 10 may be configured to extract amplitudes of sensed light intensity according to the different modulation patterns and use these amplitudes in third step 43.

In a fourth step 44, sensor units 12 send messages to share at least part of their measured transfer coefficients. In an embodiment, sensor units 12 transmit messages to other sensor units 12, the messages defining the network address of the transmitting sensor unit 12, an address of a lighting unit 10 and a transfer coefficient for the lighting unit 10, at least for lighting units 10 with transfer coefficients above a threshold value. Fourth step 44 may be part of a loop that is iterated for successive lighting units 10, the loop containing first to third step 43 as well.

In a fifth step 45 at least a first sensor unit 12 uses the transfer coefficients to establish a lighting plan.

In a simple embodiment, the lighting plan for first sensor unit 12 is selected by selecting a local group of lighting units whose transfer coefficients to the first sensor unit 12 exceed a threshold value.

FIG. 4a-c illustrate a more advanced method of selecting a local group of lighting units 10a,b for a first sensor unit 12a with a control device (not shown). This may be done by a first sub-step wherein microcontroller 32 of the first sensor unit 12a uses the transfer coefficients from different lighting units 10, 10a, 10b, to select an initial group of one or more lighting units 10a in relation to the first sensor unit 12a (e.g. a list of their network addresses), for example lighting units 10a that have transfer coefficients to the first sensor unit 12a with a value above a threshold, or the lighting unit 10a with the highest transfer coefficient to the first sensor unit 12a, or a predetermined number of highest ranking values of the transfer coefficients to the first sensor unit 12a. FIG. 4a shows such a selected lighting unit 10a forming an initial group in relation to the first sensor unit 12a by a dashed line between the first sensor unit 12a and the selected lighting unit 10a.

In a second sub-step microcontroller 32 of the first sensor unit 12a uses the transfer coefficients from the selected lighting unit 10a to other sensor units 12, 12b, to select a sub-set of one or more sensor units 12b in relation to the initial group of selected lighting unit(s) 10a (e.g. a list of their network addresses), for example sensor units 12b that have transfer coefficients from the selected lighting unit(s) 10a with a value above a threshold, or a predetermined number of highest ranking values of the transfer coefficients from the selected lighting unit(s) 10a. FIG. 4b shows sensor units 12b in the subset for selected lighting unit 10a by dashed lines between the selected lighting unit 10a of the initial group and the sensor units 12b in the subset. The original first sensor unit 12a may be considered part of the subset.

In a third sub-step microcontroller 32 of the first sensor unit 12a uses the transfer coefficients from other lighting unit 10a to the sensor units 12a, 12b, in the subset to select a group of one or more lighting units 10a,b (e.g. a list of their network addresses), for example lighting units 10b that have transfer coefficients to the sensor units 12a, 12b in the subset with a value above a threshold, or a predetermined number of highest ranking values of the transfer coefficients to the sensor units 12a, 12b in the subset. FIG. 4c shows lighting units 10b in the group by dashed lines between the lighting unit 10b in the further subset. The originally selected lighting unit 10a may be considered part of the group.

As will be appreciated, the first to third sub-steps result in the selection of a group of lighting units 10a,b in a neighborhood of the first sensor unit 12a. As may be noted, the third sub-step may a repetition of the first sub-step, using the sub-set of sensor units 12a,b instead of the first sensor unit 12a to select the group instead of the initial group. The process may be executed iteratively, each time using a successive subset of sensor units to find a larger group of lighting units, and optionally using that group of lighting units in turn to find a larger subset of sensor units. Such iterations result in the successively larger groups of lighting units 10a,b in successively larger neighborhoods of the first sensor unit 12a.

In an embodiment wherein the lighting plan is meant to support lighting in a room of a building, a microcontroller 32 of a first sensor unit 12 may perform the iterations until no more lighting units are added to the group.

Microcontroller 32 may use the final group of lighting units 10 in the lighting command process to define the lighting plan, according to which on/off command messages will be transmitted only to the addresses of all lighting units 10 of the further subset selected thus for of a first sensor unit 12a, in response to detection of a user command by control device 36 of the first sensor unit 12a. Thus, the local group of lighting units 10 can be automatically configured to control light only in one room of a building that contains the first sensor unit 12a.

In a more refined embodiment, establishment of the lighting plan may comprise defining required sensor results for at least part of the sensor units 12 for which the transfer coefficients from lighting units 10 in the final local group are above a threshold. In an embodiment required sensor results may selected that all correspond to the same light intensity.

The transfer coefficients can be used to compute a prediction of the light intensity measured at these sensor units 12 from light intensities of the light sources. When inversion of the prediction is possible, the required a set of emitted intensity values for the lighting units 10 that result in required sensor results light intensities at the sensor units 12. When the transfer coefficients do not allow for a strict inverse, an optimization algorithm may be used to determine a set of states of lighting units (each state defining whether the lighting unit is on or off, and a control value for the lighting unit 10, if it provides for adjustable intensity). An optimization criterion may be defined in terms of a penalty function for deviation between the predicted light intensities with an added cost function, like the power consumption needed to realize the lighting plan, or a measure of wear of the light sources. Then any known search algorithm can be used to search for a set of states that minimizes the optimization criterion.

However, simplified methods of determining a lighting plan may be used if desired. For example, the lighting plan may be determined simply by selecting a subset of lighting units 10 that have a transfer coefficient to the first sensor unit above a threshold and setting the states of these lighting units. In this embodiment, the threshold can be set dependent on the setting of the control device 36 of the first sensor unit. As another example, for each sensor unit 12 with a required sensing result, one or more lighting units 10 with the highest transfer coefficients to that sensor unit 12 may be selected and states may be determined only for the selected lighting units 10 so as to approximate the required sensing results.

FIG. 5 shows a flow-chart of user programming of a sensor unit 12 to illustrate use of a local lighting plan. By way of example, a programming process for selecting a spatial range for control by the sensor unit 12 will be described.

In a first step 51 microcontroller 32 of a first sensor unit 12 determines a spatial range indicated by the user, for example from a setting of control device 36. In an embodiment the setting may be used as an indication of a maximum distance to the first sensor unit 12.

In a second step 52, microcontroller 32 determines a lighting plan. In an exemplary embodiment microcontroller 32 of the first sensor unit 12 determines the range using a first sub-step of selecting the lighting unit 10 from which the transfer coefficient to the first sensor unit 12 is the highest among the lighting units 10. In a second sub-step the microcontroller 32 of the first sensor unit 12 determines sensor units 12 for which the transfer coefficients from the selected lighting unit 10 are above a threshold, the threshold being dependent on the setting of the control device 36 of the first sensor unit 12. In a third sub-step the microcontroller 32 of the first sensor unit 12 selects required sensor values for the selected sensor units 12 and for the first sensor unit 12. In an embodiment, values corresponding to equal light intensities may be selected for example. In a fourth sub-step, the microcontroller 32 of the first sensor unit 12 determines a lighting plan to realize or approximate the selected required values, by inversion or optimization as described in the preceding.

In a third step 53, microcontroller 32 causes messages to be sent to the lighting units 10 to provide the light intensity in the indicated range.

In an embodiment, the process of FIG. 5 may be executed only when microcontroller 32 is in a programming mode, but alternatively the process may be executed each time when the setting of the control device 36 of the first sensor unit 12 is changed. Use of a programming mode has the advantage that the control device 36 may be used for a different purpose outside the programming mode, for example to vary all light intensity of the lighting plan by a factor indicated by the setting or control device 36.

The microcontroller 32 may be configured to switch to the programming mode in response to detection of user selection of mode selector 38. When a programming mode is used, third step 53 may be omitted. However, this step is useful in any case as it shows the effect of range selection to the user. This means that there need not be a predetermined relation between the scale of the settings of control device 36 and the scale of the range. To show the effect, the programming mode may include a step of varying the light intensity of the lighting plan by a same factor. This may be used as a feedback to the user, allowing the user to vary the indicated range until a desired effect is created.

Determination of Lighting Plans

It should be appreciated that the described methods of determining the lighting plan are only examples. Other methods are possible.

For example, instead of requiring sensor values corresponding to the same light intensity only for a selected set of sensor units 10 near the first sensor unit 12 as described, sensor values corresponding to a second light intensity may be required for sensor units 12 in a same room as the first sensor unit 12. From these requirements a lighting plan can be determined as described. In further embodiment, successively lower sensed intensities may be required at sensor units with successively lower transfer coefficients from the lighting unit 10 with the highest transfer coefficient to the first sensor unit 12. In other embodiments, requirements may be set selectively for sensor units 12 according to their highest transfer coefficient to any one of a plurality of lighting units 10 that have the N most highest transfer coefficients to the first sensor unit 12 (N being an integer, e.g. equal to two) or that have transfer coefficients to the first sensor unit 12 above a predetermined threshold.

In general terms, the determination of the lighting plan uses the transfer coefficient between a lighting unit 10 and a sensor unit 12 as a coarse measure of distance between (proportional to the inverse square of their distance). Using this information sets of sensor units 12 and/or lighting units 10 in an area around a first sensor unit 12 with a control device 36 that has detected user input can be selected and/or distance measures to that first sensor unit 12 can be estimated. Then requirements of a lighting plan can be set for the selected set of sensor units 12 and/or lighting units 10 and/or the distances.

If the transfer coefficients are sufficiently accurate measures of distance, relative coordinates of the lighting units 10 and sensor units 12 could be computed. With NL lighting units 10 and NS sensor units 12 there are NL×NS equations for distances values, from which the coordinates of the lighting units 10 and sensor units 12 could be solved up to an overall translation if NL×NS is sufficiently high. An optimization method, which determines the coordinates that correspond to least aggregate error (e.g. sum of squares of errors) in the distances may be used for example. Given the coordinates and a selected spatial area determined from user input at a first sensor unit 12, selection of sensor units 12 and/or lighting units 10 in the area around a first sensor unit 12, or their distances is a straightforward matter.

However, for most purposes determination of coordinates is not needed. It suffices to obtain information from which sensor units 12 and/or lighting units in successively larger or smaller areas around a first sensor unit 12 can be selected, when a user inputs a command at the first sensor unit 12 to change the size of such an area.

It may suffice to determine a list of addresses of assumed immediate geographically neighboring sensor units 12 for each sensor unit 12. Such lists for different sensor units define a map in the form of a graph, with nodes that correspond to sensor units 12 and edges that point to the nodes of assumed immediate geographically neighboring sensor units 12. In this case, successive sets of sensor units 12 in successively larger areas may be selected in steps of adding immediate neighbors of sensor units 12 in the previous set.

A pair of units may be defined to be immediately neighboring units if there exists a spatial location that is at a greater distance to other units than to both units of the pair. A lighting unit 10 is at such a location for a pair of sensor units 10 if the transfer coefficients to these sensor units 12 from the lighting unit 10 are greater than the transfer coefficients of all other sensor units 12 from that lighting unit 10. Accordingly, pairs of neighboring sensor units 12 can be identified by determining, for each lighting unit 10, sensor units 12 with the highest and next highest transfer coefficients.

When the locations of the lighting units 10 are sufficiently dense, this suffices to determine all immediate neighbor pairs of sensor units 12. Conversely, if the locations of the sensor units 12 are sufficiently dense, this suffices to determine all immediate neighbor pairs of lighting units 10. Moreover, the closest lighting unit 10 to a sensor unit 12, and the closest sensor unit 12 to a lighting unit 10 can be determined from the transfer coefficients.

Although examples have been described wherein feed forward lighting control is planned, it should be appreciated that instead plans for feedback control may be constructed. In this case, selection of the sensor units 12 in an area around a first sensor unit 12 as described may be used. Then required sensing values for the selected sensor units 10 may be set for as target values in the feedback loop. For feedback control it may moreover be needed to select a set of lighting units 10 of which the light intensity can be adjusted. Each of these lighting units 10 may then be paired to a sensor unit 12, e.g. the sensor unit 12 to which the lighting unit 10 has the highest transfer coefficient compared to other sensor units 12. The coefficients c for these pairs may be set to a predetermined non-zero value and the other coefficients may be set to zero.

In other embodiments more complicated methods may be used to select the coefficients dependent on the transfer coefficients. For example In one embodiment coefficients $c(j,i)$ are selected by solving c from equations $$\mathrm{Sum} c(j,i) * R(i,j') = v$$

Herein $R(i, j')$ is the transfer coefficient from a lighting unit j' to a sensor unit i, the sum is taken over sensor units i and v=1 if j=j' and v=0 if j is unequal to j'. As long as the number of sensor units used in the feedback is equal to or greater than the number of lighting units to which feedback is applied, such coefficients $c(j, i)$ are available.

When different target values are defined for the same sensor units 12 for a plurality of different first sensor units 12, the maximum target value for each sensor unit 12 may be used.

Allocation of Tasks to Different Units

Figure 6:
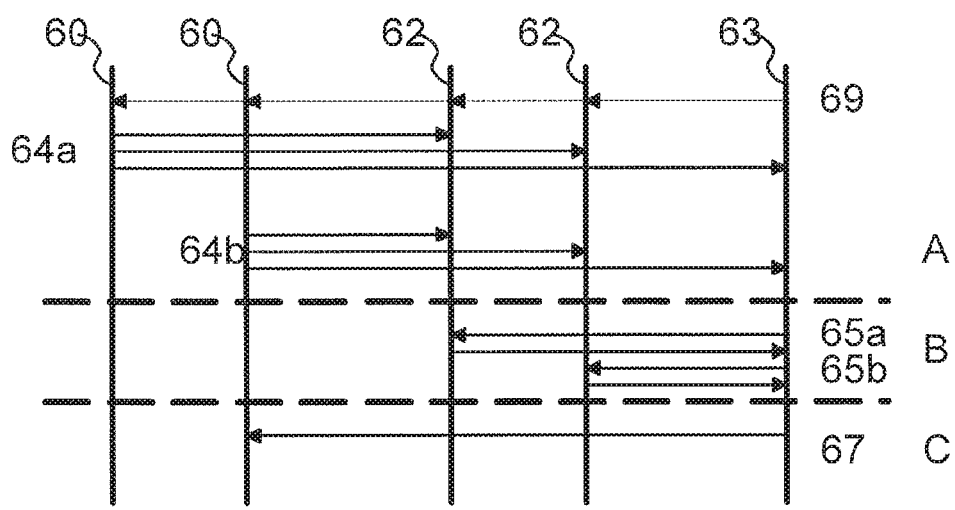
FIG. 6 shows message traffic between the lighting units and the sensor units

FIG. 6 shows message traffic between the lighting units and the sensor units in an implementation of the system. First vertical lines 60 symbolize lighting units, second vertical lines 62 symbolize sensor units and a third vertical line 63 symbolizes a sensor unit with a control device. Second vertical lines 62 symbolize sensor units and a third vertical line 63 symbolizes a sensor unit with a control device. FIG. 6 shows various stages of communication separated by dashed lines and labeled A-C.

The process may be started by a "start configuration command" message 69 to the lighting units and the sensor units. By way of example, the "start configuration command" message 69 is transmitted from the sensor unit with a control device 63. Thus command triggers a first stage A.

In first stage A transfer coefficients are determined. At this stage lighting units successively vary lighting intensity, and transmit messages 64a, 64b to sensor units to identify the lighting units that produce the intensity variation. Although two first vertical lines 60 are shown by way of example, it should be understood that more lighting units may be present, each sending the illustrated messages. Although two second vertical lines 62 are shown by way of example, it should be understood that more sensor units may be present, each receiving the illustrated messages. Instead of messages addressed to individual sensor units, broadcast messages may be used.

Each lighting unit may transmit the messages 64a, 64b immediately before, or during a time interval in which it varies the lighting intensity for example. The sensor units reads an amplitude of intensity variation during that time interval from its sensor device and the sensor unit uses the results to determine the transfer coefficients associated with the network address of the lighting unit that varied the lighting intensity.

A second stage B comprises determining a configuration for control of lighting in response to operation of the control device of the sensor unit symbolized by vertical line 63. The sensor unit with the control device sends messages with requests for information about the values of transfer coefficients to other sensor units, which return messages with the information. The sensor unit with the control device uses this information to establish a lighting plan as described. For example, the sensor unit with the control device may use its own transfer coefficients and those from the other sensor units to determine which of the lighting units and/or which of the sensor units are in a same room of a building, or which are in successively larger or smaller areas around the sensor unit with the control device, when a user indicates at that sensor unit that a larger or smaller area should be lighted in response to commands at the control device.

A third stage C comprises control of one or more lighting units according to the lighting plan, for example in response to detection of a user command from the control device of the sensor unit symbolized by vertical line 63. By way of example a message to one lighting unit is shown, but it should be appreciated that messages to a plurality of lighting units may be transmitted, dependent on the lighting plan. When feedback control is used, messages may be sent to sensor units to start messages with data for use in feedback based on sensed light intensity.

As will be appreciated the methods described in the preceding allow the control of a lighting system to be configured dependent on sensing of transfer coefficients between lighting units 10 and sensor units 12 without using external programming of the relative positions of the lighting units 10 and sensor units 12. For example, a sensor unit 12 with a control device can be automatically associated with all lighting units 10 in a room of a building without using external programming of the relative positions. As another example, user input to select an area size around a sensor unit 12 at which the user input is received can be used to select lighting units 10 and/or sensor units 12 for use to light that area, without using external programming of the relative positions.

In one embodiment, the information that results from configuration may be a list of network addresses of lighting units 10 and optionally control values for those lighting units 10 to be used by a sensor unit in response to user input at the control device 36 of that sensor unit 12. The sensor unit may be configured to transmit messages to those addresses in response to the user input at the control device 36 of that sensor unit 12.

Although FIG. 6 shows an embodiment wherein with a specific assignment of tasks to specific units, it should be appreciated that different assignments are possible. For example, although the first stage A assumes that the transfer coefficients are determined by the sensor units 12 dependent on signals from lighting units 10, it should be appreciated that alternatively sensor unit 12 may transmit sensor results to lighting units 10, each lighting unit 10 determining "its" transfer coefficients from the sensor results, based on information when the lighting unit varied light intensity. Alternatively, both lighting units 10 and sensor units 12 may transmit information to another unit (e.g. a central unit, which may also be a sensor unit, or a lighting unit), the transfer coefficients being determined in the other unit. Accordingly, the collection of transfer coefficients in the second stage B may be correspondingly different.

As another example, although the second stage B assumes that the configuration plan for response to a user command at a control device 36 is determined by the sensor unit 12 with the control device 36, it should be appreciated that the configuration may be determined in another unit, or that a distributed computation may be used. If the configuration is determined in another unit, or in a distributed way, stage B may comprise sending the resulting configuration information to the lighting units 10 and/or sensor units 12 or a central unit for use in operation.

As another example, although the third stage C assumes that the control will take place decentrally between the sensor unit 12 with the control device 36 where the command to activate lighting is received and the lighting units 10 used in the lighting plan, it should be appreciated that control may be routed via another unit. In this case, the sensor unit 12 with the control device 36 may supply information about the command to the other unit, and the other unit may supply commands to the lighting unit.

In embodiment, the determination of the transfer coefficients in response to the start configuration command may be omitted for those combinations of sensor units for which such transfer coefficients have been determined earlier. In an embodiment, the determination of transfer coefficients may be performed decoupled from configuration, for example at arbitrary time points while the lighting system is in use.

In an embodiment, the configuration is performed automatically each time when a new lighting unit or new sensor unit is added to the system. For this purpose, the lighting unit and sensor unit may be configured to transmit a "start configuration command" message when it is started up, and the sensor unit and lighting units may be configured to execute the configuration process in response to such a "start configuration command" message. In an embodiment, at least part of the lighting unit and sensor unit may have a control input for causing the unit to transmit the "start configuration command" message.

In another embodiment, at least part of the configuration process may be periodically be repeated, for example once a day. For this purpose a lighting unit or sensor unit may be configured to transmit a "start configuration command" message once it detects that no such message was sent during a preceding time interval of predetermined length.

In another embodiment, at least part of the configuration process may be repeated each time when a light plan is desired. In an embodiment this may be done each time when a user enters a command at the control device of a sensor unit.

All sensor units may have a control device, so that each can function as the first control device. But this is not necessary. In another embodiment part of the sensor units has no control device. Such sensor units may be used for the selection of a group of lighting units for the first sensor unit, even though they cannot act as the first sensor unit itself. Increasing spatial density of sensor units improves the accuracy of the configuration. Furthermore such sensor units may be used as part of feedback loops.

At least part of the sensor units may comprise a motion detector that is used as the control device. Thus, groups of lighting units may be switched on and off after the detection of motion and absence of such detection in a time interval of predetermined length respectively.

At least part of the sensor units may use a light sensor as the control device. Thus, a group of lighting units may be switched on and off upon detection that insufficient external light is available or that the light with the lighting units on exceeds a threshold respectively.

In an embodiment, different lighting plans may be constructed for different combinations of first sensor units 12. Thus for example, there may be lighting plans that indicate groups of lighting units for each of a plurality of first sensor units individually, each group indicating the lighting units that should be switched on in response to a command at the control device of a respective sensor unit. When commands from the control device of a plurality of sensor units have been received, all lighting units from the groups for this plurality of sensor units may be switched on. Alternatively, special lighting plans may be made for such a plurality, e.g. by using joint target values, or an initial group selected for the plurality of sensor units.

The invention claimed is:
1. A method of operating a lighting system, the lighting system comprising:
   lighting units; and
   sensor units, wherein at least a first sensor unit comprises a user control device or is proximately coupled to the user control device for receiving user commands from a user, the user control device being configurable, the lighting units being controlled by a lighting plan associated with a group of the lighting units, the group of the lighting units being switched on or emitting increased light intensity on detection of a user command transmitted by the user control device, the lighting plan being at least based on light transfer coefficients associated with light intensities at the sensor units measured from light output from the lighting units, the method comprising the lighting units and/or sensor units:
      determining the light transfer coefficients from the lighting units to each sensor unit, each light transfer coefficient being determined from sensed light intensity variations measured by the sensor unit based on lighting control variations detected from the lighting units; and determining the lighting plan by selection of the group of lighting units based at least on the transfer coefficients determined between the lighting units and the first sensor unit.

2. A method according to claim 1, wherein the group of lighting units is selected based on the transfer coefficients associated with the lighting units of a subset of the sensor units, the subset of the sensor units being based on the transfer coefficients for the sensor units selected from an initial group of the lighting units associated with the first sensor unit, the subset of the sensor units being a portion of the initial group.

3. A method according to claim 2, wherein the group of lighting units is selected by selectively including lighting units for which the transfer coefficients of any one of the sensor units in the sub-set is above a threshold value.

4. A method according to claim 2, wherein the group of lighting units is selected by:
setting target values for sensing results of the sensor units in the subset; and
determining the target values based on a calculation, the calculation provides the target values based on the transfer coefficients and combinations of settings of the lighting units, the calculation being associated with the combination of settings including sensing values for the sensor units that at least provide approximate target values.

5. A method according to claim 2, further comprising adjusting a size of the group of lighting units in response to user input at the first sensor unit.

6. A method according to claim 5, further comprising expanding the group in response to the user input by selecting an expanded group based on the transfer coefficients from the lighting units to a further subset of the sensor units, the further subset being selected based on the values of the transfer coefficients associated with the sensor units from the group of lighting units.

7. A method according to claim 5, wherein the initial group, the subset and/or the group are selected by comparing the transfer coefficients with one or more threshold values, the size of the group of lighting units being selected by adjusting the one or more thresholds in response to the user input.

8. A method according to claim 1, wherein a subset of lighting groups is selected by selectively including sensor units to which the transfer coefficients from any one of the lighting units in the initial group is above a threshold value.

9. A method according to claim 1, wherein the initial group of the lighting units is selected by selectively including lighting units in the initial group for which the transfer coefficients associated with the first sensor unit is above a threshold value.

10. A method according to claim 1, wherein the initial group of lighting units is selected as a final successive initial group in an iterative process wherein a successive initial group of lighting units is selected based on the transfer coefficients from the lighting units of a successive subset of the sensor units that is selected based on transfer coefficients from the successive initial group resulting from a preceding iteration.

11. A method according to claim 1, the method comprising
transmitting messages containing the values of transfer coefficients for the sensor units to the first sensor unit via a communication network,
the first sensor unit comprising: a computing: device execute selection of the group; and determination of the lighting plan based on the values of the transfer coefficients from the messages.

12. A lighting system according to claim 11, wherein the configuration unit is configured to determine the lighting plan by selecting the group of lighting units that at least comprises lighting units from which the transfer coefficient to the first sensor unit exceeds a threshold value.

13. A lighting system according to claim 11, wherein the configuration unit is configured to determine the lighting plan by limiting the selected group of lighting units to lighting units from which the transfer coefficient to the first sensor unit exceeds a threshold value.

14. A lighting system according to claim 11, wherein the configuration unit is configured to determine the lighting plan by:
selecting first ones of the lighting units from which the transfer coefficient to the first sensor unit exceeds a first threshold value;
selecting further ones of the sensor units for which the transfer coefficients from the first ones of the lighting unit to the further ones of the sensor units exceed a second threshold value; and
selecting second ones of the lighting units from which the transfer coefficient to the further ones of the sensor units exceeds a third threshold value.

15. A tangible computer readable medium that stores an executable program that, when executed by a computing device, facilitates performance of the method of claim 1.

16. A method as claimed in claim 1, wherein the lighting plan is determined by selecting the group of lighting units that at least comprises lighting units from which the transfer coefficient to the first sensor unit exceeds a threshold value.

17. A method according to claim 1, wherein the selected group of lighting units is limited to lighting units from which the transfer coefficient to the first sensor unit exceeds a threshold value.

18. A method according to claim 1, wherein the lighting plan is determined by:
selecting first ones of the lighting units from which the transfer coefficient to the first sensor unit exceeds a first threshold value;
selecting further ones of the sensor units for which the transfer coefficients from the first ones of the lighting unit to the further ones of the sensor units exceed a second threshold value; and
selecting second ones of the lighting units from which the transfer coefficient to the further ones of the sensor units exceeds a third threshold value.

19. A lighting system, comprising:
lighting units;
sensor units wherein at least a first sensor unit comprises a user control device or is proximately coupled to the user control device, the user control device receiving user commands from a user, the user control device being configurable;
a configuration unit comprising a lighting unit, a sensor unit or a central unit;
a communication network coupling the lighting units and sensor units, the lighting system being configured to control the lighting units according to a lighting plan defined by a group of the lighting units associated with the control device of the first sensor unit, the group of lighting units being switched on or emitting increased light intensity on detection of a user command transmitted by the user control device, the lighting plan being at least based on light transfer coefficients associated with light intensities at the sensor units measured from light output from the lighting units, wherein each sensor unit is configured to:
determine light transfer coefficients based on light intensity variations measured by the sensor unit associated with lighting control variations detected from each of the lighting units; and
transmit the light transfer coefficients via the communication network to the configuration unit, the configuration unit being configured to:
receive the transmitted light transfer coefficients, and determine transfer coefficients from light intensity variations measured by the sensor unit when the configuration unit is the sensor unit, the transfer coefficients associated with the lighting control variations of each of the lighting units;
determine the lighting plan by selecting the group of lighting units based on at least the transfer coefficients from the lighting units to the first sensor unit; and
transmit commands to the lighting units in the selected group in response to detection of the user command by the user control device of the first sensor unit.

20. A lighting system according to claim 19, wherein the configuration unit is configured to determine the lighting plan by:
selecting an initial group of one or more of the lighting units associated with the first sensor unit based on the received transfer coefficients and/or the transfer coefficients determined by the configuration unit;
selecting a subset of further sensor units based on the received and/or determined transfer coefficients for the lighting units in the initial group; and
selecting the group based on the transfer coefficients from the lighting units associated with the subset of the sensor units.

21. A configuration unit for use in a lighting system, the lighting system comprising:
lighting units;
sensor units wherein at least a first sensor unit comprises a user control device or is proximately coupled to the user control device, the user control device receiving user commands from a user, the user control device being configurable;
the configuration unit comprising a lighting unit, a sensor unit or a central unit;
a communication network coupling the lighting units and sensor units, the lighting system being configured to control the lighting units according to a lighting plan defined by a group of the lighting units associated with the control device of the first sensor unit, the group of lighting units being switched on or emitting increased light intensity on detection of a user command transmitted by the user control device, the lighting plan being at least based on light transfer coefficients associated with light intensities at the sensor units measured from light output from the lighting units, wherein the configuration unit further comprises an interface to the communication network and computing device coupled to the interface configured to:
receive transfer coefficients and, further determine transfer coefficients from light intensity variations measured by the sensor unit when the sensor unit is the configuration unit, the transfer coefficients associated with the lighting control variations of each of the lighting units;
determine the lighting plan by selecting the group of lighting units based on at least the transfer coefficients from the lighting units to the first sensor unit; and
transmit commands to the lighting units in the selected group in response to detection of the user command by the user control device of the first sensor unit.

22. A sensor unit for use in a lighting system, the lighting system comprising:
lighting units;
multiple sensor units, wherein the lighting units are controlled according to a lighting plan defining a group of the lighting units associated with a first sensor unit, the first sensor unit comprising:
a light sensor;
a user control device for receiving user commands when a user enters the user commands via the user control device, the user being proximate to the user control device, the user control device being configurable;
a communication network interface;
a computing device coupled to the light sensor, the user control device and the communication network interface, the computing device configured to:
determine transfer coefficients from the lighting units to the first sensor unit associated with sensed light intensity variations measured by the light sensor in correspondence with lighting control variations of respective ones of the lighting units;
select an initial group of one or more of the lighting units associated with the sensor unit on the basis of the determined transfer coefficients;
receive, from the multiple sensor units via the communication network interface, transfer coefficients from the lighting units to the multiple sensor units;
determine the lighting plan by selecting the group of lighting units based on at least the transfer coefficients from the lighting units to the first sensor unit; and
transmit commands to the lighting units in the selected group in response to detection of a user command of the user control device.

23. A sensor unit according to claim 22, wherein the computing device is further configured to adjust a size of said group of lighting units in response to user input, by adjusting one or more thresholds used for the selection of the initial group, the sub-set and/or the group in response to the user input and/or by iteratively expanding the initial group used for the selection of the group based on the transfer coefficients.

* * * * *